June 4, 1963    F. A. LOVING, JR    3,092,528
DEFLAGRATING COMPOSITION
Filed March 23, 1960
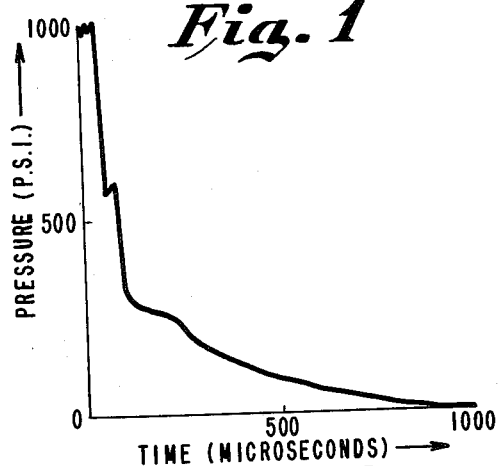
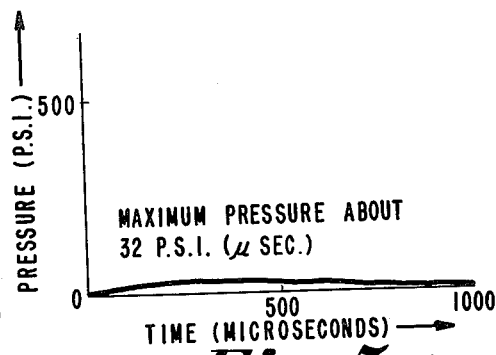
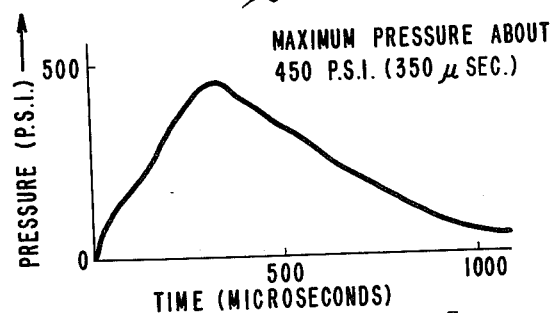
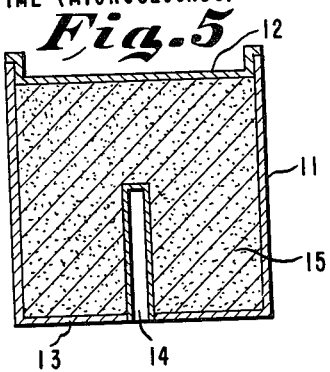
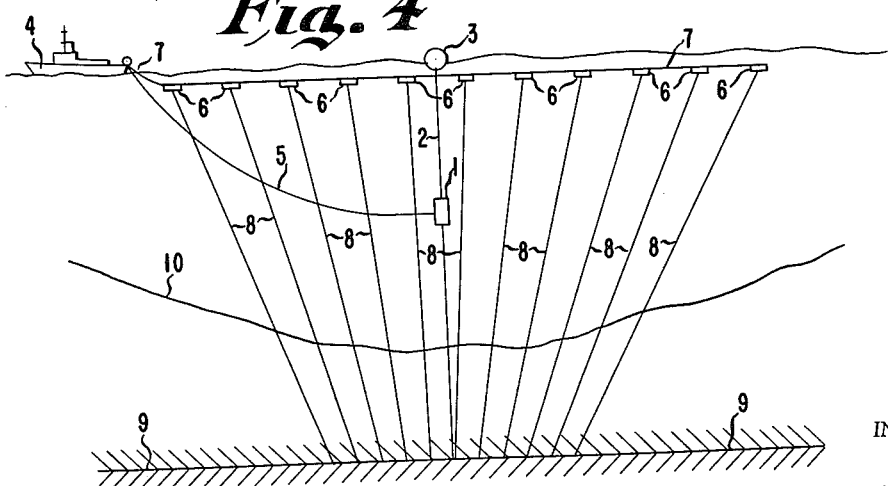
INVENTOR
FRANK ABRAHAM LOVING, JR.
BY Thos. A. Wilson
ATTORNEY

# United States Patent Office 3,092,528
Patented June 4, 1963

3,092,528
DEFLAGRATING COMPOSITION
Frank Abraham Loving, Jr., Wenonah, N.J., assignor to E. I. du Pont de Nemours and Company, Wilmington, Del., a corporation of Delaware
Filed Mar. 23, 1960, Ser. No. 18,220
2 Claims. (Cl. 149—41)

The present invention relates to an improved explosive composition particularly suitable for use in underwater seismic prospecting. This application is a continuation-in-part of my copending application Serial No. 709,385, filed January 16, 1958, now abandoned.

Generally, in seismic prospecting a detonating explosive (i.e. an explosive having a reaction rate greater than the speed of sound in the reacting material) is used as the source of seismic energy, because of the high seismic return thereby obtained. However, such detonating explosives are disadvantageous when employed in underwater ("off-shore") seismic exploration. When these detonating explosives are used in such work, serious damage to valuable marine life occurs. Studies made of the effect on fish of such explosives when detonated under water, for example the tests reported by Hubbs and Rechnitzer in "California Fish and Game," vol. 38, 333–366 (July, 1952), have shown that damage to fish is principally associated with the presence of a virtually instantaneous pressure rise (shock wave) which occurs adjacent to a detonating explosive shot under water, this pressure spike or discontinuity always extending for some distance from the explosive. This abrupt rise in pressure rather than the magnitude of the resulting pressure is held responsible for the first mortality.

In contrast, a deflagrating explosive (i.e., an explosive having a reaction rate less than the speed of sound in the reacting material), such as black powder, does not exhibit this abrupt pressure rise when shot under water and causes only slight, if any damage to marine life. The maximum pressure resulting from a black powder deflagration is low and is built up over a relatively long period of time.

Consequently, in many off-shore locations, the geophysicist is limited to the use of black powder charges in order to prevent damage to marine life. This imposes a serious handicap upon the seismic exploration because black powder is a notably poor source of seismic energy.

My experiments have shown that seismic energy is transmitted most efficiently from water to underwater geological formation by those explosives producing the highest pressures in water. As afore-mentioned, conventional deflagrating explosives, such as black powder, when shot under water react very slowly to produce very low pressures, which are less lethal to fish but are of low efficiency in the exploration. On the other hand, the detonating explosives react rapidly to produce the instantaneous high pressure peak, which is highly lethal to fish but is of high efficiency in the exploration. Obviously, the provision of an explosive composition for "off-shore" seismic prospecting that combines the advantageous features of both types of explosives, i.e., the slow rise to maximum pressure of the deflagrating type and the high maximum pressure of the detonating type, would be of great value to the art.

Accordingly, an object of the present invention is the provision of a novel explosive composition particularly for seismic prospecting in off-shore exploration whereby damage to marine life is held to a minimum. Another object of the present invention is the provision of an improved composition for off-shore seismic prospecting whereby increased seismic return is obtained. A further object of the present invention is the provision of a composition for off-shore seismic prospecting which produces a pressure pulse free of the pressure spike characteristic of detonating explosives and characterized by a maximum pressure of magnitude substantially greater than that obtained from conventional deflagrating explosives.

I have found that the foregoing objects may be achieved when I provide a seismic charge of an essentially oxygen-balanced deflagrating explosive consisting of sodium nitrate, sulfur, charcoal, starch, granular metallic fuel, and potassium perchlorate within a compact waterproof container.

In order to describe more fully the nature of the present invention, reference now is made to the accompanying drawings in which FIGURES 1 and 2 are reproductions of actual pressure-time oscillograms illustrating the underwater pressure pulse produced by conventional seismic explosives (a detonating and a deflagrating explosive, respectively), and FIGURE 3 is a reproduction illustrating the pulse from my novel seismic explosive.

FIGURE 4 is a schematic diagram of a seismic prospecting assembly wherein the composition of the present invention is employed, and FIGURE 5 is a schematic view in section of an explosive container suitable for the present seismic composition.

Referring now to the figures in greater detail,

FIGURE 1 shows the pressure pulse, as defined by pressure-time measurements, obtained when a commercial detonating seismic explosive (sodium nitrate-ammonium nitrate-TNT mixture) packaged in a 2-inch-diameter by 6-inch-long metal can was initiated by a conventional electric blasting cap. The pressure pulse was measured 10 feet from the charge. As is evident, the maximum pressure of about 1000 p.s.i. is built up practically instantaneously. This pressure-time spike represents the shock wave which is typical of the pulse produced by all detonating explosives and is held responsible for the damage to fish caused by detonating explosives.

FIGURE 2 is representative of the black powder pressure pulse, shown by pressure-time measurements made 20 feet from a 1-gallon container filled with black powder. As may be seen in the figure, the maximum pressure, which was only about 32 p.s.i., was obtained in about 300 microseconds after actuation of the charge. Although the black powder pressure-time curve does not exhibit the undesirable discontinuity of the curve of FIGURE 1, the magnitude of the maximum pressure is not sufficient to provide an effective seismic return.

FIGURE 3 illustrates the pressure pulse provided by the composition of the present invention. The pressure-time measurements were made at a distance of 20 feet from a 1-gallon container filled with the modified deflagrating composition of the present invention. As is apparent, maximum pressure was not obtained until 350 microseconds after the ignition of the charge, the maximum pressure being 450 p.s.i. A comparison of FIGURES 1 to 3 indicates that the present composition produces a pulse free of the pressure spike of the detonating explosive and having a maximum pressure substantially greater (about 15 times greater) than the pulse from black powder. By means of my invention, not only is lethal discontinuity of detonating explosives eliminated but also the pressures produced are of a magnitude sufficient for the desired seismic return.

In FIGURE 4, representing a seismic prospecting assembly, 1 is a charge of the deflagrating composition of a granular metallic fuel, sodium nitrate, charcoal, sulfur, starch and potassium perchlorate, which charge is suspended underwater by line 2 attached to float 3. The charge 1 is ignited by an electric ignition means positioned within charge 1 and connected to a source of electricity on the boat 4 by lead wires 5. An array of geophones indicated by 6 is suspended in recording position, generally just below the surface of the ocean, by line 7 attached to boat 4. The geophones 6 receive and record the explosively generated seismic waves 8 which are reflected from the reflecting strata 9 below the ocean floor 10.

In FIGURE 5 showing a compact waterproof container, for example of metal, suitable for packaging the novel explosive charge, 11 is the cylindrical wall of the container, 12 is the tight-fitting lid, and 13 is the integral bottom of the container. The height of the wall 11 preferably does not exceed 4 times the diameter of the surface 13. A rigid tube, or cap well, 14 extending into the deflagrating composition 15, preferably to the center of composition 15, is provided in the lower portion of the container to hold the ignition means, while maintaining the container waterproof.

The following examples serve to illustrate specific embodiments of the composition of the present invention. However, they will be understood to be illustrative only and not as limiting the invention in any manner.

EXAMPLE 1

Several mixtures of 43.20% sodium nitrate, 7.20% sulfur, 9.00% charcoal, 0.60% starch, 14% atomized aluminum the particles of which were essentially spherical and had a diameter between 5 and 500 microns, and 26% of an inorganic oxidizing salt were prepared. Thirteen pounds of each mixture was loaded into a 1-gallon metal container of the type shown in FIGURE 5, the mixture filling the container. A standard seismograph blasting cap was used to ignite the charges, and the maximum pressure obtained from each charge was measured at a point twenty feet from the charge. The compositions and corresponding peak pressures are listed in the following table.

*Table I*

| Mix No. | Compn. (NaNO$_3$, S, C, starch, Al, +) | Peak pressure (p.s.i.) |
| --- | --- | --- |
| A | Potassium Nitrate | 9 |
| B | Ammonium Nitrate | 150 |
| C | Potassium Perchlorate | 730 |

As shown by Table I, the desired pressure pulse surprisingly is obtained only when potassium perchlorate constitutes the additional oxidizing salt in the mixture, the peak pressures produced when a nitrate is used being far below that required for effective seismic return. Obviously, therefore, the use of the perchlorate is critical to the present invention, and, hence, the incorporation of this perchlorate in the composition constitutes a necessary embodiment of the composition of the present invention.

EXAMPLE 2

The procedure of Example 1 was repeated with the exception that flaked aluminum (pigment-grade) was substituted for the atomized aluminum. This substitution resulted in a 26% reduction in peak pressure.

As shown by this example, the granular nature of the metal fuel is also critical to the present invention. Flaked aluminum is specially prepared for use in pigments by milling aluminum granules in the presence of stearic acid. The resulting material is in the form of leaf-like platelets submicroscopic in thickness and generally resembles graphite. Although I do not wish to be limited by a theoretical discussion of the functioning of the composition of the present invention, I believe that the inclusion of such a flaked fuel results in the coating of the particles with a heat-reflecting layer, which coating has a deleterious effect upon the deflagration of the mixture, that is, a retardation of the reaction rate which may lead to a complete cessation of the reaction. On the other hand, metallic particles of too large a grist may themselves heat up and react too slowly to be effective. Therefore, for efficient functioning of the mixture, the metallic fuel should be of a particle size such that not more than 1% of the granules will be held on a 35-mesh screen and such that from 30 to 60% of the granules will pass through a 325-mesh screen. Such granules essentially have a minimum dimension greater than 5 microns and maximum dimension less than 500 microns.

Among the metallic fuels of high heat of combustion that may be used in the composition, i.e., aluminum, magnesium, iron, and ferrosilicon, aluminum is preferred, especially that type of aluminum known as atomized aluminum. The atomized aluminum generally has particles of a minimum and maximum dimension within the range of 5 and 500 mircons and is preferred not only on the basis of its efficiency but also because of its low cost.

The granulation of the perchlorate is not critical to the present invention. Any one of the commercially available grades of the perchlorate, either coarse or fine, may be used.

EXAMPLE 3

Two mixings of sodium nitrate, sulfur, charcoal, starch, atomized aluminum, and potassium perchlorate were made up, one suitable for use in a 1-quart container and the other for a 1-gallon container, both containers being waterproof and of metal. The compositions are listed in Table II.

*Table II*

| Mix E (1-qt. container) | Mix F (1-gal. container) |
| --- | --- |
| 28.8% NaNO$_3$<br>4.8% S<br>6.0% charcoal<br>21.0% Al<br>39.0% KClO$_4$<br>0.4% starch | 43.2% NaNO$_3$<br>7.2% S<br>9.0% charcoal<br>14.0% Al<br>26.0% KClO$_4$<br>0.6% starch |

The characteristics of the pressure pulses produced by mixes E and F in their waterproof containers in comparison with those of ordinary black blasting powder in similar containers were measured, the measurements being given in Table III.

*Table III*

| Composition | Mix E | Black powder | Mix F | Black powder |
| --- | --- | --- | --- | --- |
| Container | 1-qt. | 1-qt. | 1-gal. | 1-gal. |
| Max. Pressure (p.s.i.) measured 20 ft. from charge | | | 450 | 32 |
| Max. Pressure (p.s.i.) measured 10 ft. from charge | 690 | 60 | | |
| Rise time [1] (microseconds) | 150 | 100 | 350 | 300 |

[1] Time from arrival of wave at measuring point to attainment of max. pressure.

In the selection of the proportions of the components to be employed, the size, or capacity, of the container in which the composition is to be packaged must be considered, inasmuch as the most effective proportions of ingredients depend upon the size, and shape, of the container. When a deflagrating explosive is shot under water, some portion of the contents of the package may become wet before this portion is consumed by the flame. This wet portion, therefore, will not burn. Since the burning rate of a deflagrating mixture is increased by increased confinement, the larger the container and consequently the charge, the faster will be the ultimate burning rate due to the confinement provided by the package and also the water. Thus, for a large container, the material burns faster and the portion of material lost due to wetting is smaller. When a small charge is used the burning acceleration due to confinement is less, and, therefore, more of the metallic fuel must be used to provide the requisite acceleration of burning rate. A small charge, for example a ½-pound charge, may require the inclusion of 30% of the metallic fuel, whereas a large charge, e.g., a 50-pound charge, may require only 5% of the metallic fuel. The perchlorate, of course, is added in an amount proportional to the fuel added, in order to provide the essentially oxygen-balanced composition. I have found that in general for containers of the sizes commonly used in seismic prospecting, the proportions of ingredients may be varied within the following listed ranges, the exact proportions selected from these ranges of course being governed by the choice of container size.

| | Percent |
|---|---|
| Sodium nitrate | 21.6–61.9 |
| Sulfur | 3.6–10.3 |
| Charcoal | 4.5–12.9 |
| Metallic fuel | 5–25 |
| Potassium perchlorate | 9–45 |
| Starch | 0.3–0.9 |

An additional factor which must be considered in the selection of the particular container, and to some extent the specific composition, is the shape of the container. Obviously, a long fuse-like container or a flat plate-like container would not afford the confinement inherent to a more equally dimensioned container. Hence, the packaging of a 10-pound charge of a deflagrating mixture having the desired reaction rate in such a fuse-like container would not serve to produce the desired seismic pulse, which would, however, be produced by the packaging of the same explosive charge in a compact container. Consequently, a further prerequisite for efficient seismic work with the composition of the present invention is that the maximum dimension of the container be no more than four times the minimum dimension.

Moreover, for proper deflagration, the contents of the container should be ignited internally, preferably as near the center of the charge as possible. To effect the desired ignition, the ignition means, e.g., an electric blasting cap or squib, may be inserted in a rigid tube, or cap well, extending axially from one end of the container into the container, preferably to the center of the container. A package of a design preferred for the purposes afore-outlined is shown in FIGURE 5. The container naturally should be waterproof, and suitable materials for its fabrication and that of the cap well are rigid metals and plastics, metals being preferred on the basis of economy.

In summary, I have found that a seismic pulse of desirable configuration may be produced by a deflagrating mixture of a granular metallic fuel, sulfur, charcoal, starch, sodium nitrate, and potassium perchlorate, when the mixture is packaged in a compact waterproof container and is internally, preferably centrally, ignited.

The composition of the present invention has been described in detail in the foregoing. Accordingly, I intend to be limited only by the following claims.

I claim:

1. A deflagrating composition for underwater seismic exploration consisting essentially of a substantially oxygen balanced mixture of 21.6–61.9% sodium nitrate, 3.6–10.3% sulfur, 4.5–12.9% charcoal, 0.3–0.9% starch, 9–45% of potassium perchlorate and 5–25% of a granular metallic fuel selected from the group consisting of aluminum, magnesium, iron and ferrosilicon, said granular metallic fuel having a particle size within the range of at least about 5 microns and not more than 500 microns.

2. A charge according to claim 1 wherein said granular metallic fuel is aluminum.

References Cited in the file of this patent

UNITED STATES PATENTS

| 1,310,466 | Becket | July 22, 1919 |
| 1,824,141 | Hill | Sept. 22, 1931 |
| 2,168,030 | Holmes | Aug. 1, 1939 |
| 2,215,608 | Garcia | Sept. 24, 1940 |
| 2,320,972 | Lindsley | June 1, 1943 |
| 2,775,200 | Guenter | Dec. 25, 1956 |